United States Patent
Slatter (10) Patent No.: US 7,756,364 B2
(45) Date of Patent: Jul. 13, 2010

(54) DIGITAL PEN AND PAPER SYSTEM

(75) Inventor: David Neil Slatter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1023 days.

(21) Appl. No.: 11/491,173

(22) Filed: Jul. 24, 2006

(65) Prior Publication Data

US 2007/0025645 A1 Feb. 1, 2007

(30) Foreign Application Priority Data

Jul. 30, 2005 (GB) ................................. 0515737.5

(51) Int. Cl.
*G06K 9/22* (2006.01)
*G06F 3/033* (2006.01)

(52) U.S. Cl. ...................... 382/313; 345/179

(58) Field of Classification Search ................ 382/187, 382/276, 305, 312, 313; 235/494; 345/156, 345/173–183; 84/475; 710/72; 455/422.1, 455/422

See application file for complete search history.

(56) References Cited

U.S. PATENT DOCUMENTS

| 6,058,304 | A | * | 5/2000 | Callaghan et al. ......... 455/422.1 |
| 6,215,480 | B1 | | 4/2001 | Danis et al. |
| 6,538,187 | B2 | * | 3/2003 | Beigi ........................... 84/475 |
| 6,577,299 | B1 | * | 6/2003 | Schiller et al. .............. 345/179 |
| 6,603,464 | B1 | * | 8/2003 | Rabin .......................... 345/179 |
| 6,618,040 | B1 | * | 9/2003 | Mattaway et al. ........... 345/173 |
| 7,002,560 | B2 | * | 2/2006 | Graham ....................... 345/179 |
| 7,048,198 | B2 | * | 5/2006 | Ladas et al. ................. 235/494 |
| 7,162,087 | B2 | * | 1/2007 | Bryborn ...................... 382/187 |
| 7,561,145 | B2 | * | 7/2009 | Garside et al. .............. 345/173 |
| 7,627,703 | B2 | * | 12/2009 | Oliver ......................... 710/72 |
| 2002/0024542 | A1 | | 2/2002 | Ericson et al. |

FOREIGN PATENT DOCUMENTS

WO 0195091 A1 12/2001

OTHER PUBLICATIONS

Abstract of WO03046708 Jun. 5, 2003 Anoto AB (SE); Bryborn Mattias (SE); Sandstroem Ola (SE).
Abstract of WO0126033 Apr. 12, 2001 Anoto AB (SE); Pettersson Mats Petter (SE); Edsoe Tomas (SE).
Abstract of WO0073983 Dec. 7, 2000 Iconizer AB (SE); Ericson Petter (SE); Hugosson Ola (SE).
Abstract of WO0171643 Sep. 27, 2001 Anoto AB (SE); Wiebe Linus (SE).

* cited by examiner

*Primary Examiner*—Kanji Patel (57) ABSTRACT

A digital pen and paper system comprising a digital pen adapted to acquire disposition data representing a position and orientation of the pen relative to a portion of a carrier using a position-determining pattern on the carrier, the pen comprising a display operable to present to a user of the system display data representing at least one character for transcription by the user, the or each character transformed to appear to the user as if it is printed on the carrier, and a method for effecting transcription of information using such a system.

20 Claims, 9 Drawing Sheets

DIGITAL PEN AND PAPER SYSTEM

RELATED APPLICATION

This application claims priority from co-pending United Kingdom utility application entitled, "Digital Pen and Paper System" having serial no. GB 0515737.5, filed Jul. 30, 2005, which is entirely incorporated herein by reference.

FIELD OF THE INVENTION

The present invention relates generally to the field of hand-held writing devices, and more specifically to a hand-held writing device comprising a display.

BACKGROUND

Many digital pen and paper systems have been proposed. One that is in use is the Anoto system, which can be implemented using a device such as the Logitech 102 pen, available from Logitech of 6505 Kaiser Drive, Fremont, Calif. 94555, USA. Generally, using such technology, the pen senses a position determining pattern that has been printed onto a page and an evaluation of the pen's position, and movements, is made using data collected by the pen.

WO 03/046708 discloses a system of this kind. In the known Anoto type arrangements, the pen is connected by a Universal Serial Bus (USB) cable or wirelessly to a processing device such as a mobile telephone or a personal computer. The processing device receives data from the pen and can identify the document which has been marked by the pen.

This can result in the processing device determining information about how the document should be handled. This information may identify an application, perhaps stored on the processing device or held remotely, which enables the information from the pen to be processed.

Current instantiations of digital pen and paper technology are passive in that the pen is only able to determine its location on a page and store information relating to what has been written at the location.

Known digital pen and paper technology lacks the facility to prompt a user as a result of data generated during the operation of the pen and its interaction with application programs.

SUMMARY

According to a first aspect of the present invention, there is provided a digital pen and paper system comprising a digital pen adapted to acquire disposition data representing a position and orientation of the pen relative to a portion of a carrier using a position-determining pattern on the carrier, the pen comprising a display operable to present to a user of the system display data representing at least one character for transcription by the user, the or each character transformed to appear to the user as if it is printed on the carrier.

According to a second aspect of the present invention, there is provided a method for effecting transcription of information onto a carrier using a digital pen, the pen comprising a display for displaying the information to be transcribed, the method comprising determining a position and orientation of said pen relative to said carrier, presenting information representing display data to a user of the pen using the display, the display data generated on the basis of the determined pen position and/or orientation, wherein the display data is processed in order to provide the visual illusion that said information for presentation appears on a surface of said carrier.

BRIEF DESCRIPTION OF THE FIGURES

For a better understanding of the present invention, and to further highlight the ways in which it may be brought into effect, embodiments will now be described, by way of example only, with reference to the following drawings in which.

It should be emphasised that the term "comprises/comprising" when used in this specification specifies the presence of stated features, integers, steps or components but does not preclude the presence or addition of one or more other features, integers, steps, components or groups thereof.

DETAILED DESCRIPTION OF THE PREFERRED EMBODIMENTS

Figure 1:
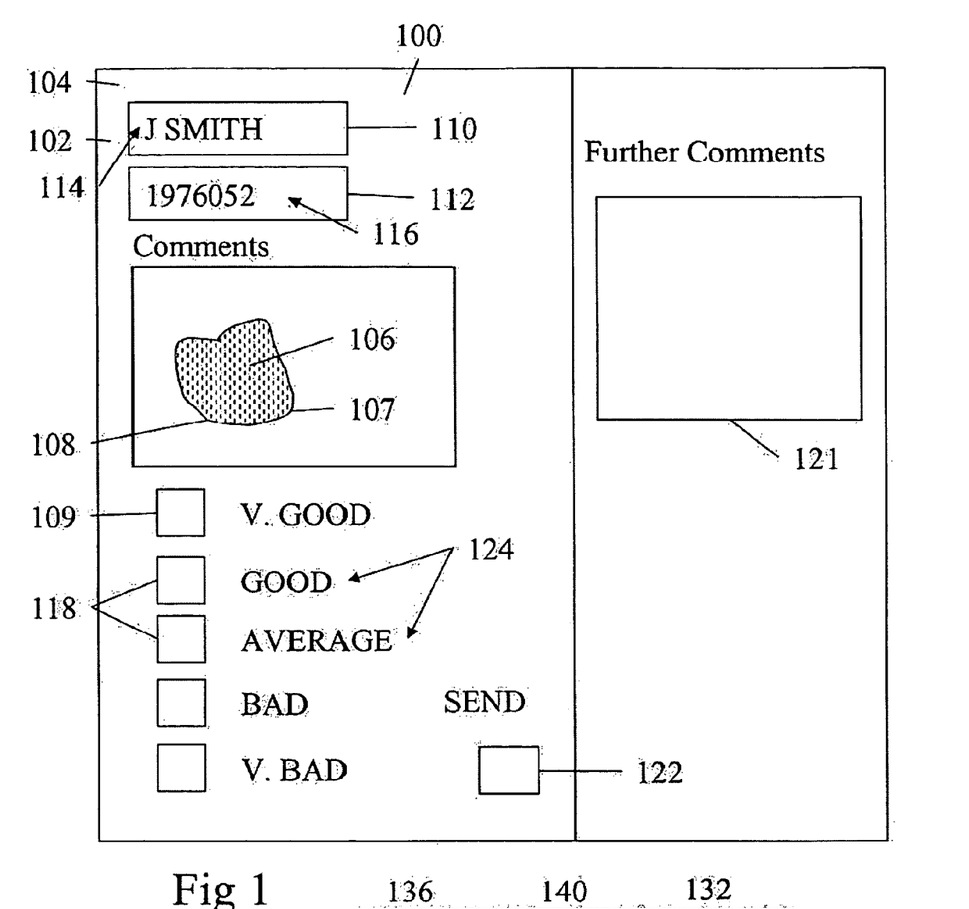
FIG. 1 is a schematic representation of a document suitable for use with a digital pen and paper system.

Referring to FIG. 1, a document 100 for use in a digital pen and paper system comprises a carrier 102 in the form of a single sheet of paper 104 with position identifying markings 106 printed on some parts of it to form areas 107 of a position identifying pattern 108. Also printed on the paper 104 are further markings 109 which are clearly visible to a human user of the form, and which make up the content of the document 100. The content 109 will obviously depend entirely on the intended use of the document. In this case an example of a very simple two page questionnaire is shown, and the content includes a number of boxes 110, 112 which can be pre-printed with user specific information such as the user's name 114 and a document identification number 116. The content further comprises a number of check boxes 118 any one of which is to be marked by the user, and a larger box 121 in which the user can write comments. The form content also includes a send box 122 which can be checked by the user when they have completed the questionnaire to initiate a document completion process by which pen stroke data is forwarded for processing, and typographical information on the form such as the headings or labels 124 for the various boxes 110, 112, 118, 121. Other alternatives are possible.

The position identifying pattern 108 can be printed onto the parts of the form which the user is expected to write on or mark, that is within the check boxes 118, the comment box 121 and the send box 122 for example.

Figure 2:
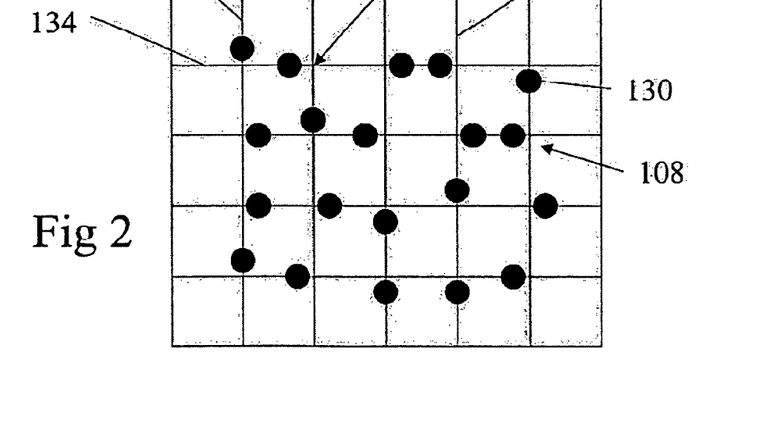
FIG. 2 is a detailed section of a document as shown in FIG. 1.

Referring to FIG. 2, the position identifying pattern 108 is made up of a number of dots 130 arranged on an imaginary grid 132. The grid 132 can be considered as being made up of horizontal and vertical lines 134, 136 defining a number of intersections 140 where they cross thereby forming a lattice. A marking 130, in the form of a dot for example, is provided at each intersection 140, but offset slightly in one of four possible directions up, down, left or right, from the actual intersection 140. The dot offsets are arranged to vary in a systematic way so that any group of a sufficient number of dots 130, for example any group of 36 dots arranged in a six by six square, will be unique within a very large area of the pattern. This large area is defined as a total imaginary pattern space, and only a small part of the pattern space is taken up by the pattern on the document 100. By allocating a known area of the pattern space to the document 100, for example by means of a co-ordinate reference, the document and any position on the patterned parts of it can be identified from the pattern printed on it. An example of this type of pattern is described in WO 01/26033. It will be appreciated that other position identifying patterns can equally be used. Some examples of other suitable patterns are described in WO 00/73983 and WO 01/71643 for example.

Figure 3:
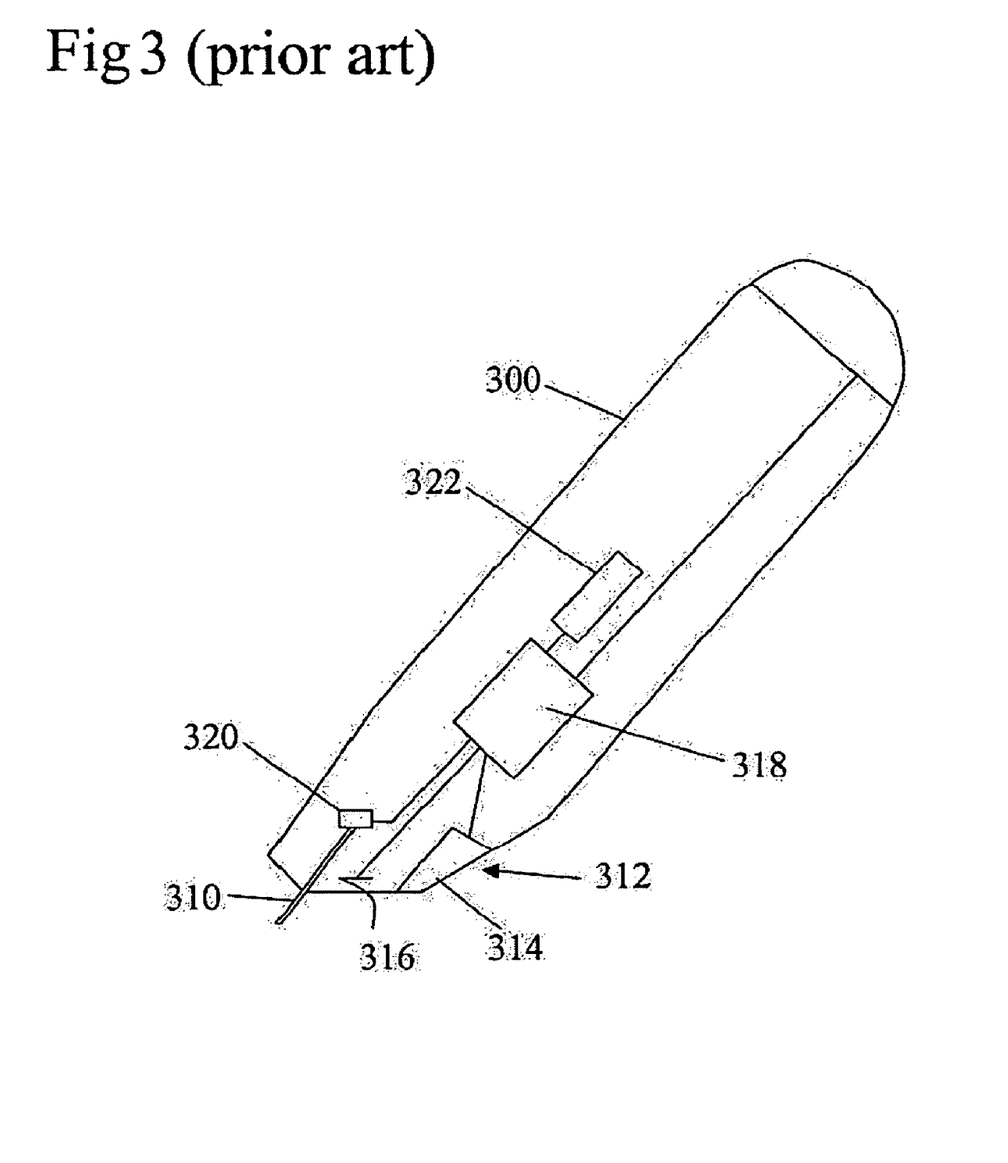
FIG. 3 is a schematic representation of a digital pen suitable for use with a digital pen and paper system.

Referring to FIG. 3, a pen 300 comprises a writing stylus 310, and a camera 312 comprising, for example, an infra red (IR) LED 314 and an IR sensor 316. The camera 312 is arranged to image an area adjacent to the tip of the pen stylus 310. A processor 318 processes images from the camera 312. A pressure sensor 320 detects when the stylus 310 is in contact with the document 100 and triggers operation of the camera 312. Whenever the pen is being used on a patterned area of the document 100, the processor 318 can therefore determine from the pattern 108 the position of the stylus of the pen whenever it is in contact with the document 100. From this it can determine the position and shape of any marks made on the patterned areas of the document 100. This information is stored in a memory 322 in the pen as it is being used. When the user has finished marking the document, in this case when the questionnaire is completed for example, this is recorded in a document completion process, for example by making a mark with the pen in the send box 122. The pen is arranged to recognize the pattern in the send box 122 and determine from that pattern the identity of the document 100. The information stored regarding the location of a user's pen strokes in the memory 320 is transferred to a suitable processor upon the user placing the pen 300 in the send box 122. The document may comprise simply a sheet of paper with a position determining pattern printed on it (no printed human discernable meaningful content is visible), possibly with the whole area of the sheet of paper covered with pattern. Another alternative is a sheet of paper with pattern but not human discernable content apart from a "send" box or "work complete" box; it may have one or more instruction areas for the pen to read but not extra text associated with pen instructions.

Figure 4:
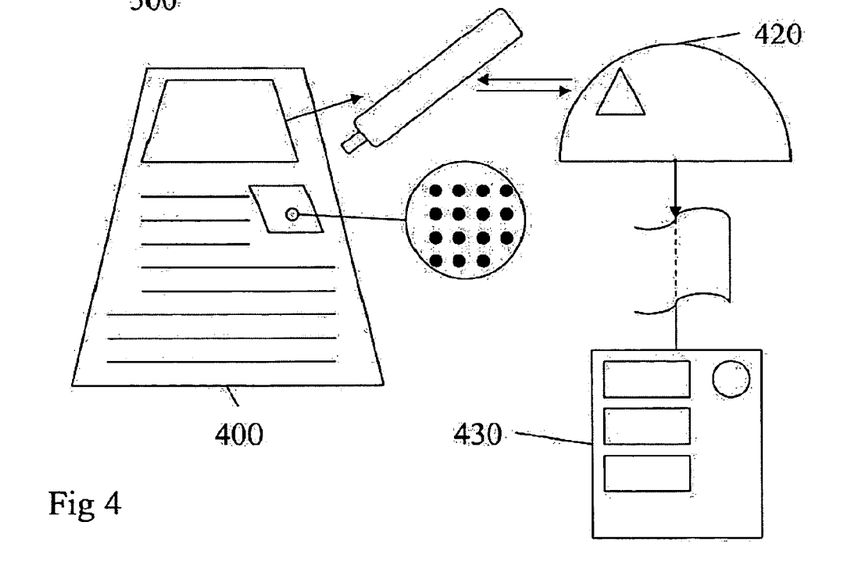
FIG. 4 is a schematic representation of a digital pen and base station suitable for use with a digital pen and paper system.

The pen is provided with an output port which comprises at least one electrical contact that connects to corresponding contacts on a base station. As shown in FIG. 4, the pen reads information from a document 400. The pen transmits positional and status data to the base station 420 contacts on the base station. It may alternatively connect to the base station wirelessly. The base station can send information received from the pen to a remote server 430, across a telecommunication network, for example.

Figure 5:
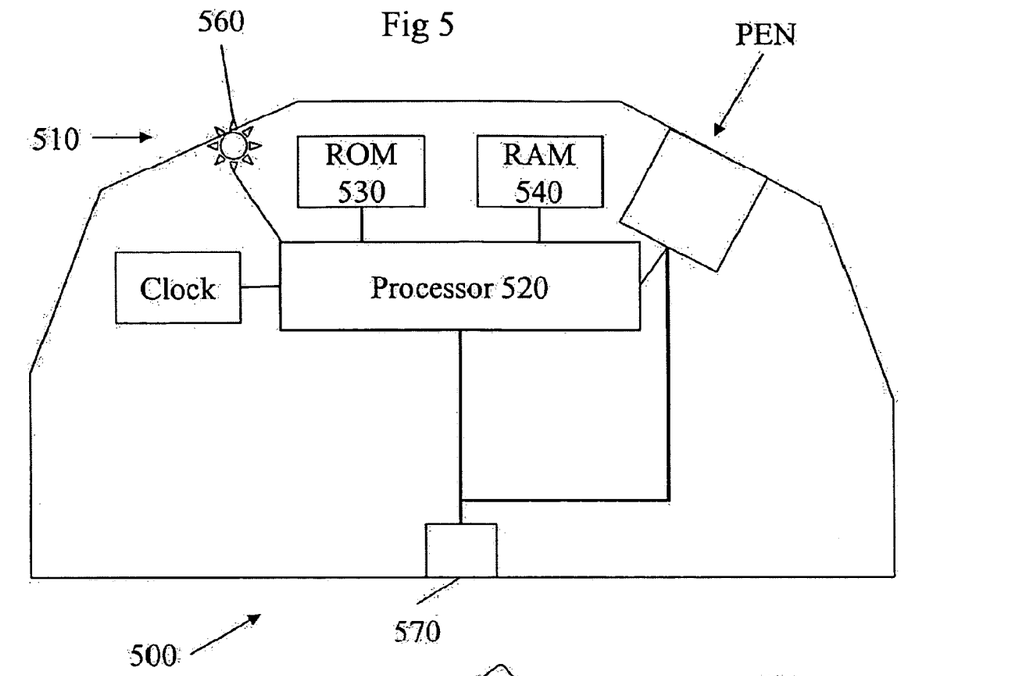
FIG. 5 is a detailed section of a base station as shown in FIG. 4.

As shown in more detail in FIG. 5, a base station 500 comprises a compact, self contained unit 510 housing a dedicated processor 520, an area of read only memory 530 which permanently stores program instructions to be executed by the processor 520, an area of temporary RAM 540 in which information from the pen is stored along with information needed to send out pen information.

Figure 6:
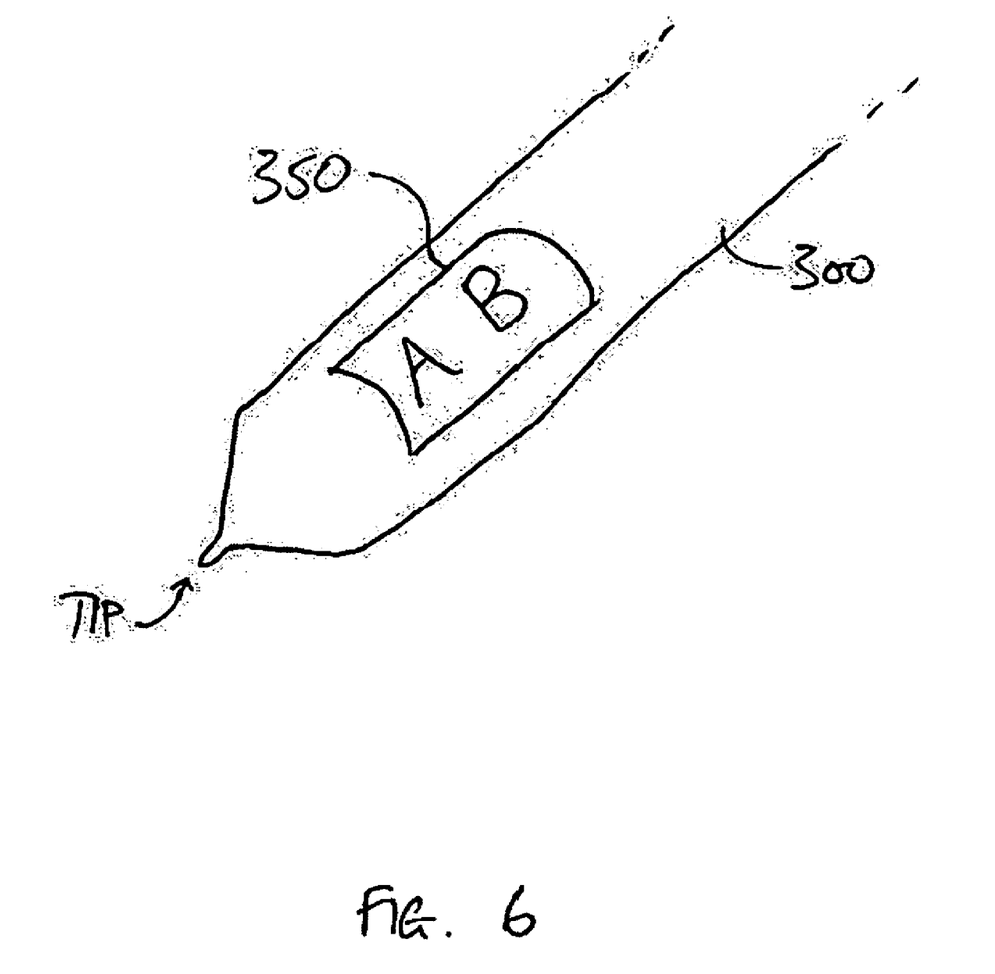
FIG. 6 is a schematic representation of a detailed section of a pen according to an embodiment.

According to a preferred embodiment, pen 300 further comprises an electronic display 350. Advantageously, display 350 is located just above the writing tip of pen 300 as depicted in FIG. 6 which shows the display 350 when in use, and when viewed from the perspective of a right-handed user. Preferably, display 350 can present at least two characters for viewing by a user, although one, or more than two is possible depending on the use.

The display can be an LCD display, or other suitable display type. Data output to the display 350 can be conveniently transcribed by a user of the pen 300 to document 100, or other suitable digital paper. Data presented to a user by display 350 can be in the form of characters such as numbers, letters, glyphs, or any other format suitable for being deciphered by the user. According to an embodiment, characters presented to a user using display 350 are distorted using a perspective transformation so that they appear as if they are printed on a surface of a carrier with which pen 300 is being used. The nature of this required perspective distortion/transformation can be determined from the observer/display/pen/paper geometry and the angle that the pen makes with the paper (i.e. the relative orientation of the pen and paper). A default observer position is assumed, and the other variables are measured by the pen as part of the normal decoding algorithm used to determine a pen position on the paper using the predefined paper patterns.

Figure 7:
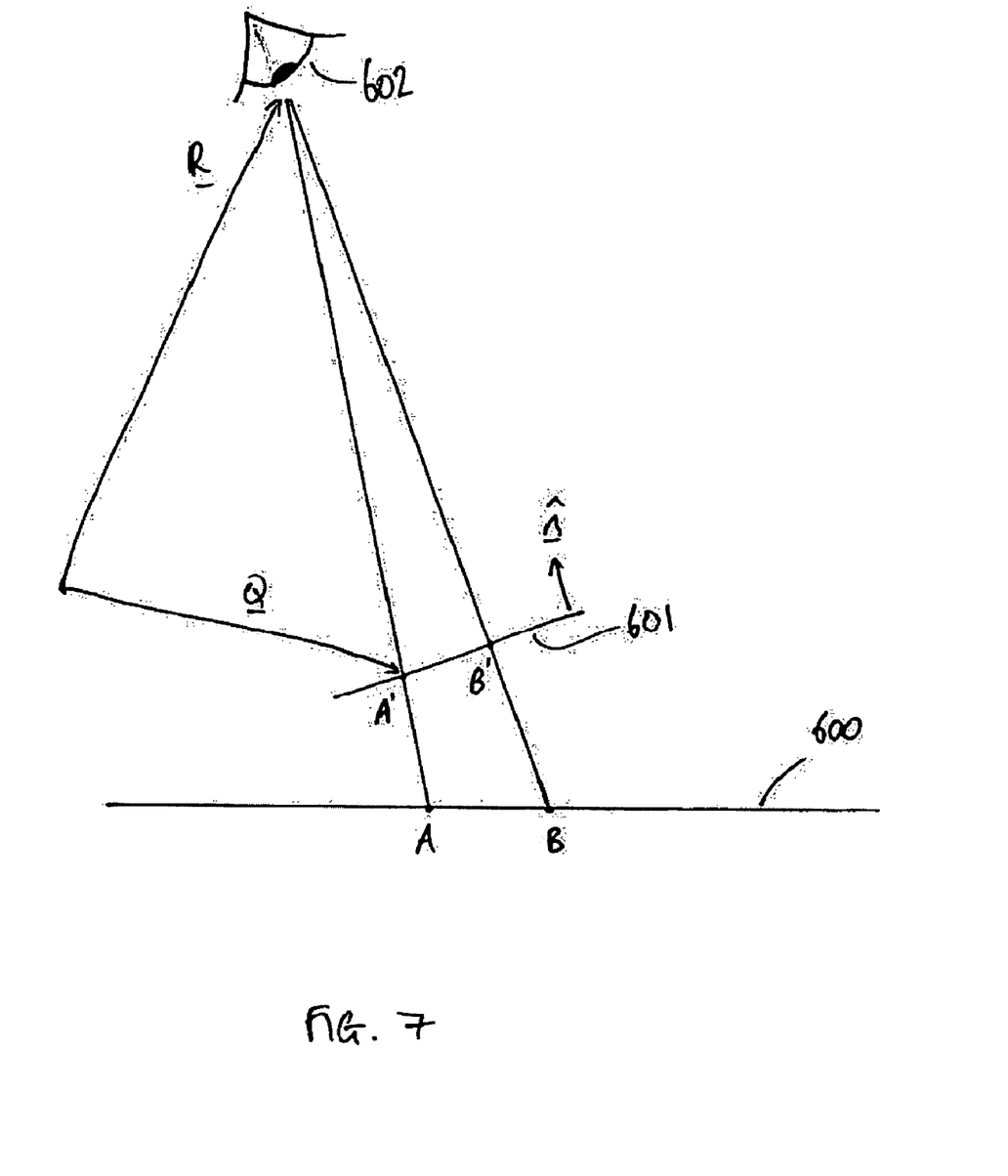
FIG. 7 is a schematic representation of a relationship between an observer, a display of the pen illustrated in FIG. 6 and a carrier.

The nature of the required distortion is a perspective transformation that is constructed in accordance with a method such as that described in, for example, "Graphics Gems" p 475 (Academic Press Inc (1990), edited by Andrew S. Glassner). FIG. 7 is a schematic representation of an observer/display/pen/paper configuration. Points A and B represent the location on the surface 600 of a carrier at which information appears to be printed when viewed from the perspective of the observer 602. Points and A' and B' represent the location at which the information appears as pixels on a display surface (virtual or other) of a pen (not shown) in order to give the illusion that information is presented at points A and B of surface 600.

The values of the vectors R, Q and n are required in order to determine a required perspective transformation for transforming the points A and B to A', B' respectively.

When determining a desired perspective transformation, the observer (eye) position 602, R, is generally assigned a positional value corresponding to overhead of the lower centre of the document surface 600. Other alternatives are possible, however, this general position provides the best notional position for an observer for a perspective transformation to be successfully employed. The vector Q can be determined using the (x,y) position of the pen on the paper 600, and the displacement of the display surface 601 from the contact point of the pen with the surface 600. The (x,y) position can be recovered using the methods as outlined in WO 00/126032. Other alternatives are possible.

The unit vector normal to the display surface 601, n, changes as the pen is manipulated by the user, and this must be continuously measured to compute new transformations for the displayed information to maintain the illusion that information presented to the observer appears as if it is written on surface 600. Given that the display 601 and a camera of the pen (such as 312) are rigidly attached to the pen, the orientation of the display surface 601 has a fixed angular orientation relative to the imaging plane of the pen. The orientation of the pen imaging device (e.g. camera 312) is determined by identifying four non-collinear points in a pattern of the paper 600 and the corresponding four points in the camera imaging plane. The relative (x,y) positions for the paper can then be determined using the method as outlined in WO 00/126032.

The positions of the points in the image plane are known directly from their pixel addresses. With this information, the perspective transformation between surface 600 and the image plane of the pen camera is determined using, for example, the method as described in "A plane measuring Device", A. Criminisi, I. Reid, A Zisserman (Department of Engineering Science, University of Oxford, Proceedings of the British Machine Vision Association Conference 1997), BMVC97, Session 10, ISBN 0 952 18987 9. The unit vector normal to the imaging plane can be determined from data from the determined transformation matrix according to, for example, Graphics Gems II, p 331 (Academic Press Inc (1991), edited by James Arvo), and n is determined by adding two rotations corresponding to the fixed relative orientation of the imaging plane and the display surface 601.

Figure 8:
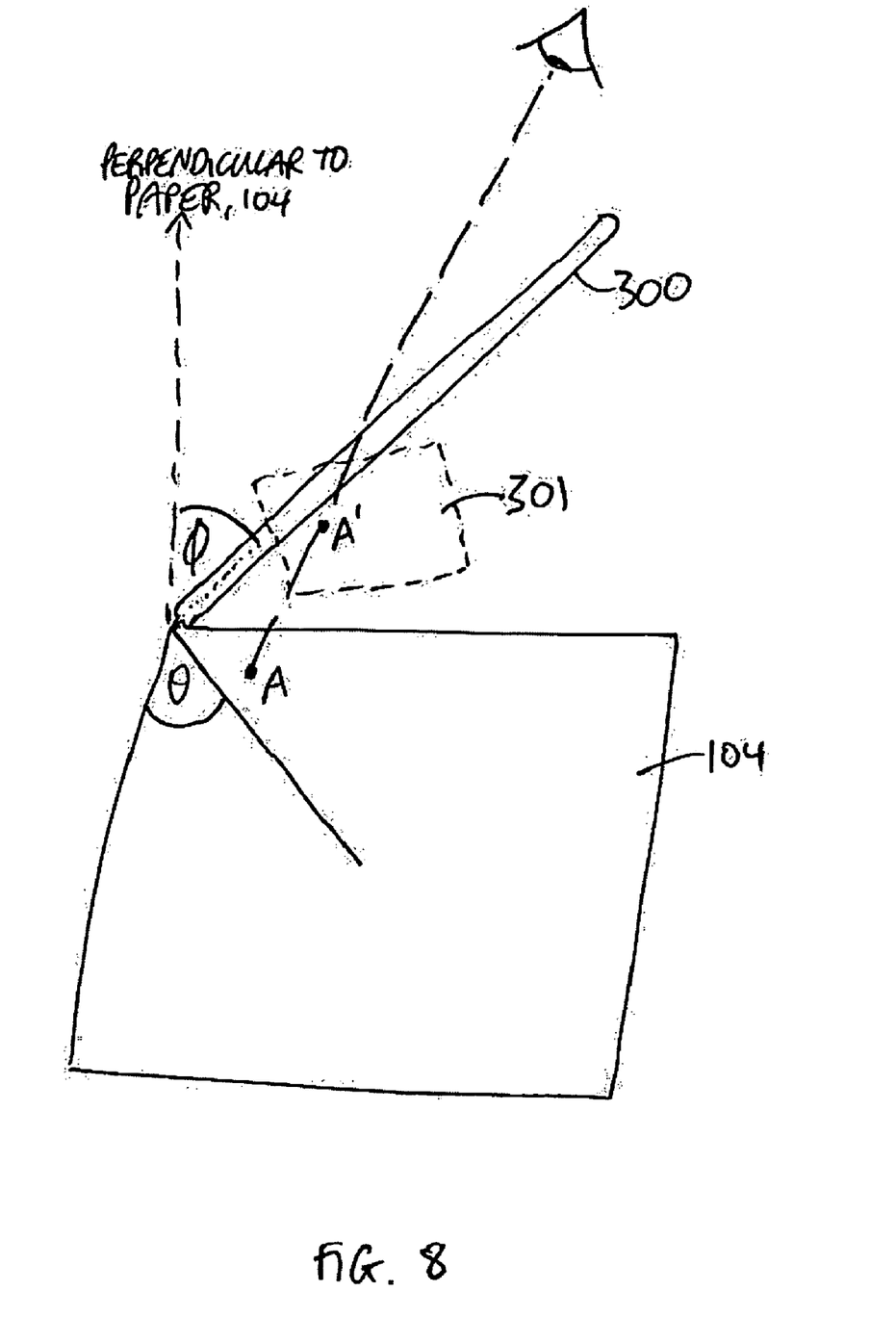
FIG. 8 is a further schematic representation of a relationship between an observer, a display of the pen illustrated in FIG. 6 and a carrier.

With reference to FIG. 8, pen 300 is being used on paper 104. A display surface 301 of pen 300 is depicted. The position of an observer is shown, and how a point A on paper surface 104 can be simulated by a point A' on the display surface 301. The display surface presents information to the observer. Information appearing on surface 301 actually appears on a display proper 350 of the pen 300, but such information appearing on display 350 is suitably transformed using a perspective transform determined as explained above in order to provide the illusion that the information is appearing as if it is coming from a virtual display appearing at the location of 301. That is to say, information output to display 350 is displayed in a transformed state in order to appear as if it is written/printed on a surface with which pen 300 is being used.

The pen can determine its relative position on the page using markings 106 as explained above, and can generate disposition data representing such a position and/or orientation. The orientation of the pen when being used, and its angle of incidence to page 104 causes an image of the pattern 108 obtained by camera 312 to be distorted since the camera will be imaging the pattern at an angle which is not perpendicular to page 104. Processor 318 is able to compensate for the orientation and angle of incidence of the pen when determining the portion of the pattern 108 being imaged. It is therefore possible to determine an azimuthal angle (θ) representing a pen angle from an axis in a plane parallel to the paper, and a polar angle (φ) representing a pen angle from an axis in a plane perpendicular to the paper. Other measures are possible. For example, pen 300 can comprise sensors operable to determine a change in the position and/or orientation of the pen, and generate disposition data on the basis of any determined changes.

Advantageously, and according to an embodiment, the determined orientation/angle information can be used in determining a desired perspective transform for character information which is to be presented to a user using display 350 as explained above. More specifically, characters displayed on display 350 of pen 300 can be distorted/transformed on the basis of the current orientation and angle of incidence of the pen and paper in order to make the characters appear as if they are printed on the page surface. The transform and hence the visual illusion can be updated in response to changes in pen position and/or orientation as the open is used. The position of a character on the display 350 can move as pen 300 moves across the page, by scrolling for example, with a particular character preferably having a fixed displacement relative to a target position on the paper. For a right-handed user of the pen 300, the relative displacement can be made small in order to reinforce the illusion that the user is tracing over characters already written on the paper. For left-handed users, there can be a shift of several characters (for example), but the displacement can be held constant reinforcing the illusion that characters are being copied from one position on the paper to another. A rate of scrolling can be determined on the basis of the normal decoding algorithms of the pen which are used to measure the paper/pen geometry, the angles the pen makes with the paper (θ,φ), and an instantaneous position of then pen.

Therefore, with reference to FIG. 6, display 350, has two characters thereon, and, when viewed from the perspective of a user of the pen, the characters appear as if they are printed on the page 104. As the pen is moved across the page, microprocessor 318 determines that a change in pen position has occurred by virtue of the change in image data generated by the pen camera 312. Pen orientation data, including data representing the angle of incidence of the pen with the paper, and the angle made with a horizontal (or vertical) plane with respect to the page is updated, and the data is used to determine a suitable perspective transform, and required rate of movement of the characters on the display 350 in order to maintain the illusion to the user that the displayed characters are printed on the page, i.e. that the characters have a fixed displacement relative to a particular position on the page, such as a target position for example.

Figure 9:
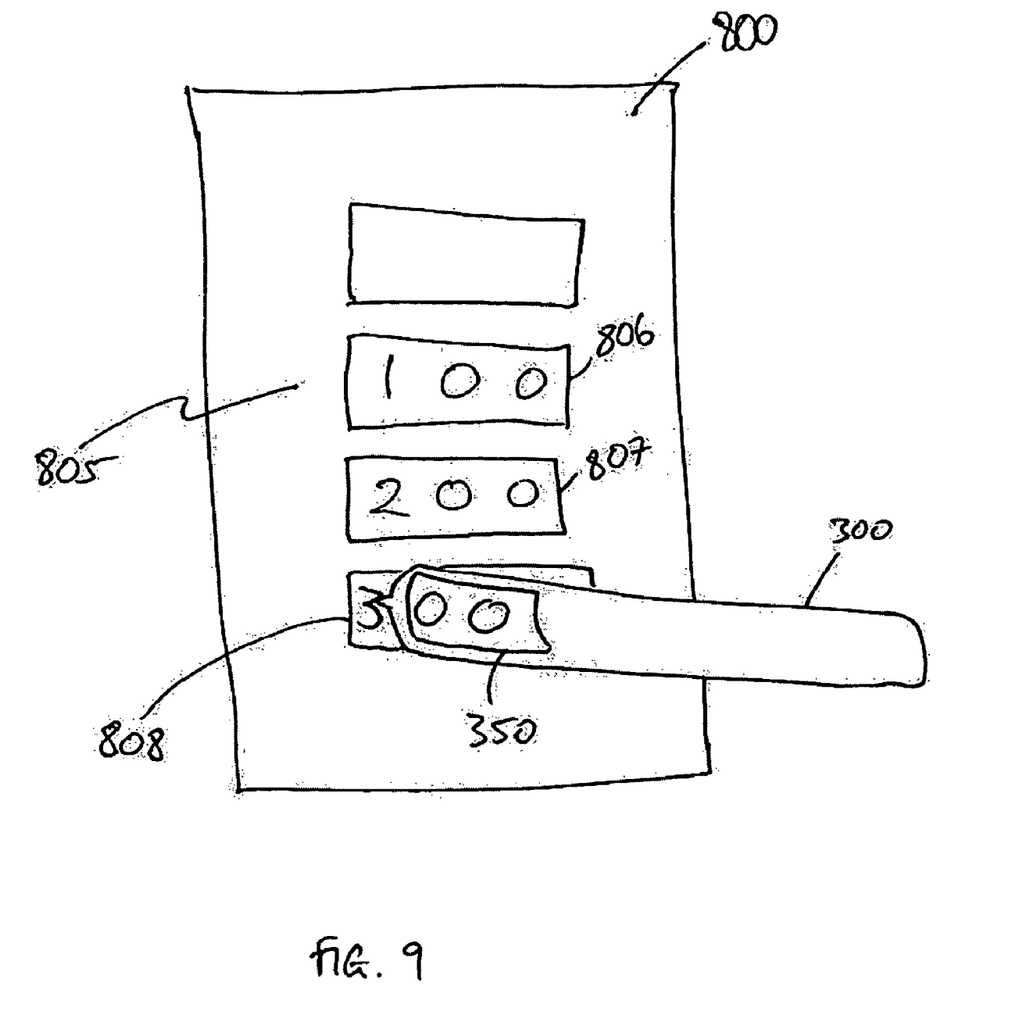
FIG. 9 is a schematic representation of a digital pen and paper form suitable for use with a digital pen and paper system according to an embodiment.

FIG. 9 is a schematic representation of a pen 300 being used with a digital form 800. The form 800 contains numerous fields 805 in which data can be entered using pen 300. In the particular example of FIG. 8, the fields 805 are suitable for having numeric data entered therein, and in this respect the form 800 can be considered to be a spreadsheet, or similar, for example. Other alternatives are possible. Certain ones of the fields 805 can have numeric data entered therein, whilst the content of others of the fields 805 depends on the content entered into other fields. For example, the content of field 808 depends on the numeric content entered into fields 806 and 807, such that the value of the numeric data in 808 is some function of that in 806 and 807. For the sake of simplicity, we will assume that the function is a summation, so that the value of 808 relates to the sum of the values in 806 and 807 for example.

According to an embodiment, a user of pen 300 annotates form 800, and fields 806 and 807 with desired characters, which in this case are numeric values, but can be any characters as explained above. In response to the desired values being entered, pen 300 is operable to determine a value to be entered into field 808 and display this value, or part thereof depending on display size, and display the determined value to a user of the pen using the display 350 of pen 300. So, for example, if the value 100 is entered into field 806, and 200 is entered in to field 807, the pen can display the number 300 to a user indicating that this value is to be entered into field 808 since field 808 represents the summation of the values in field 806, 807. It will be appreciated that the above is a trivial example, and that many fields of a form may be linked in numerous ways and that the values which should be entered into them are numerous depending on the functional relationship between such linked fields.

The calculation in relation to the values entered in fields 806, 807 can be performed by the pen 300 or can be performed using a device remote from the pen. If the calculation is performed by the pen, it could be necessary to identify the form being used in order that the pen 300 can have the relationship and relevant functions relating to the form fields loaded into a memory thereof. For example, a specific box on the form 800 which identifies the form can be checked or read by the pen. Relevant data can then be loaded into a pen memory, either wirelessly or using a wired link to a computer, which computer can be connected to the internet, or other network or server etc, where such data can be retrieved. Once stored in a memory of pen 300, the data can then be used in order to determine which functions should be applied to data entered on the form, and the relevant results displayed to a user as explained above.

If calculations are performed using a device remote from pen 300, the pen can be connected wirelessly (eg Bluetooth, or using an IEEE 802.11x connection), or using a wired link to the device. The pen is operable to transmit and receive data using the link to the remote device. So for example, in response to data being entered into a field of form 800 the pen can transmit the data to the remote device which can process the data, and send data to the pen relating to a value to be entered in a field of the form which has been calculated on the basis of the data received form pen 300.

According to a further embodiment, pen 300 can include functionality in order to aid a user in writing characters by providing a predictive function in which a word is displayed to a user in response to data written by the user. So, for example, a user writing a word with pen 300 will be continuously prompted using display 350 with the remainder of the word, which can scroll as necessary depending on display size/word length for example. Alternatively, the next letter of the word can be displayed to a user in response to what has just been written. It will appreciated that a number of words could be the word which the user is intending to write, in which case, the most likely word, or a portion thereof, can be displayed depending on the characters just written, with the prediction becoming more accurate the more letters are written until the desired word has been identified.

Figure 10A:
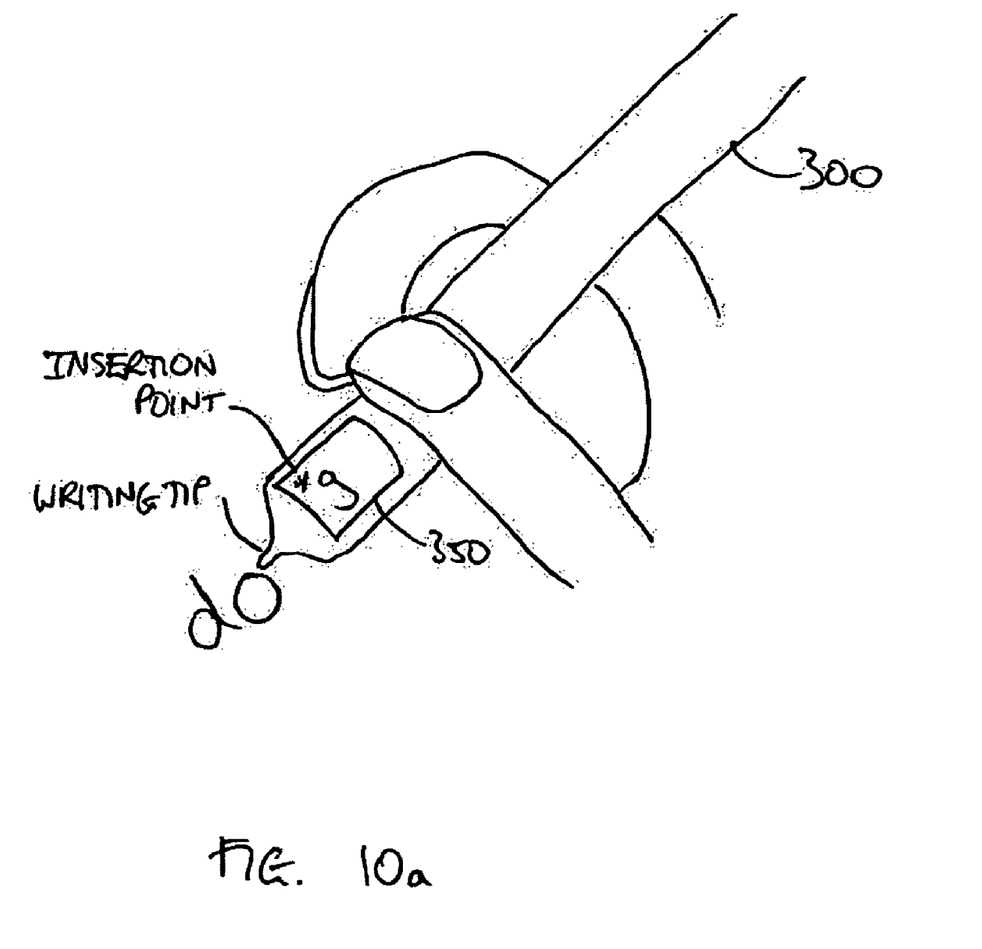
FIGS. 10a and 10b are schematic representations of respective right- and left-handed exemplary implementations of a digital pen according to an embodiment.
Figure 10B:
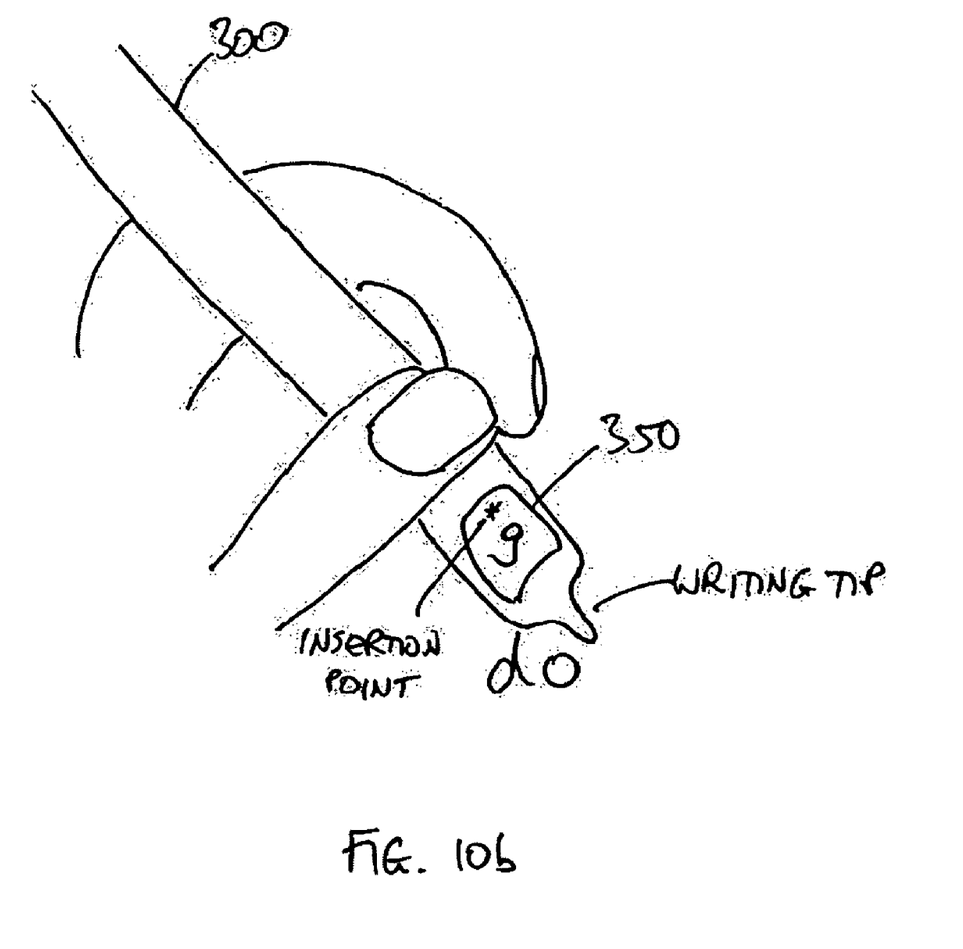

FIGS. 10*a* and 10*b* are schematic representations of pen 300 in use by right-handed and left-handed users respectively. A writing tip of pen 300 is incident on a page, and a word ('dog') is written by the user. Display 350 presents to the user a letter of the word to be written next ('g') on the basis of the letters just written. Alternatively, the letter 'g' can be displayed to a user in response to data written by the pen on other areas or fields of a page as explained above. In this case, a word has been 'calculated' from previous inputs.

Display 350 presents to a user an insertion point indicator. The position of the indicator varies depending on the character to be entered and whether a user is left- or right-handed. The indicator can present to the user a point representing a position on the page at which the next character should begin to be inserted. As explained above, the characters presented to a user, and the indicator appear to have a fixed relative displacement relative to a target position on the page, which in the case of indicator is a desired point of insertion of the next character.

The invention claimed is:

1. A digital pen and paper system comprising:
a digital pen adapted to acquire disposition data representing a position and orientation of the pen relative to a portion of a carrier using a position-determining pattern on the carrier, the pen comprising a display operable to present to a user of the system display data representing at least one character for transcription by the user, the or each character transformed to appear to the user as if it is printed on the carrier.

2. A digital pen and paper system as claimed in claim 1, wherein the or each character is transformed according to a perspective transformation determined using the disposition data.

3. A digital pen and paper system as claimed in claim 2, wherein the disposition data is used to determine azimuthal angle data representing a pen angle from an axis in a plane parallel to the carrier, and polar angle data representing a pen angle from an axis in a plane perpendicular to the carrier, the respective angle data used to determine the perspective transformation.

4. A digital pen and paper system as claimed in claim 3, wherein the azimuthal angle data and the polar angle data are determined using the position-determining pattern on the carrier.

5. A digital pen and paper system as claimed in claim 3, wherein the azimuthal angle data and the polar angle data are determined using at least one pen sensor operable to determine a change in a pen position and/or orientation.

6. A digital pen and paper system as claimed in claim 1, wherein the or each character is scrolled across the display at a predetermined speed.

7. A digital pen and paper system as claimed in claim 1, wherein the or each character is scrolled across the display at a speed determined in response to a change in the disposition data representing a change in position of the pen relative to the carrier.

8. A digital pen and paper system as claimed in claim 1, wherein the or each character is scrolled across the display at a speed sufficient to ensure that, as the pen moves relative to the carrier, the or each character has a fixed relative displacement to a target position on said carrier.

9. A digital pen and paper system as claimed in claim 8, wherein said target position relates to a current position of the tip of said pen on the carrier.

10. A digital pen and paper system as claimed in claim 1, wherein said display data is updated in response to a change in disposition data relating a change in position of the pen relative to the carrier.

11. A digital pen and paper system as claimed in claim 10, wherein the display data is updated in response to a determination that a character has been transcribed by a user to said carrier.

12. A digital pen and paper system as claimed in claim 1, wherein said display data is updated on the basis of a determination, using said disposition data, of a character written to the carrier using the pen.

13. A digital pen and paper system as claimed in claim 1, wherein said carrier comprises a plurality of fields for data entry, and wherein the display data is updated on the basis of data transcribed to at least one of said fields.

14. A digital pen and paper system as claimed in claim 13, wherein said display data is updated in response to information transcribed into a first field of said carrier with data representing information for entry into a second field, said first and second fields linked by at least one function relating the information transcribed into the first field with the information for entry into the second field.

15. A digital pen and paper system as claimed in claim 1, wherein said display data is dependent upon the position of the pen relative to the carrier.

16. A digital pen comprising a display for use with a system as claimed in claim 1.

17. A method for effecting transcription of information onto a carrier using a digital pen, the method comprising:
  determining a position and orientation of said pen relative to said carrier;
  presenting information representing display data to a user of the pen using a display located on a surface of the pen, the display data generated on the basis of the determined pen position and/or orientation, wherein the display data is processed in order to provide the visual illusion that said information for presentation appears on a surface of said carrier.

18. A method as claimed in claim 17, wherein the display data is processed using a perspective transformation determined on the basis of the position and/or orientation of said pen relative to said carrier.

19. A method for effecting transcription of information onto a carrier using a digital pen, the pen comprising a display for displaying the information to be transcribed, the method comprising:
  determining a position and orientation of said pen relative to said carrier comprising determining azimuthal angle data representing a pen angle from an axis in a plane parallel to the carrier, and polar angle data representing a pen angle from an axis in a plane perpendicular to the carrier; and
  presenting information representing display data to a user of the pen using the display, the display data generated on the basis of the determined pen position and/or orientation, wherein the display data is processed in order to provide the visual illusion that said information for presentation appears on a surface of said carrier.

20. A method as claimed in claim 19, wherein the respective angle data is used to determine the perspective transformation.

* * * * *